United States Patent [19]

Plummer

[11] Patent Number: 4,528,760
[45] Date of Patent: Jul. 16, 1985

[54] CLINOMETER

[75] Inventor: Dexter R. Plummer, Ongar, England

[73] Assignee: PA Consulting Services Limited, London, England

[21] Appl. No.: 236,567

[22] Filed: Feb. 20, 1981

[30] Foreign Application Priority Data

Feb. 28, 1980 [GB] United Kingdom ............... 8006761

[51] Int. Cl.³ ............................................. G01C 9/06
[52] U.S. Cl. .................................................. 33/366
[58] Field of Search ....................................... 33/366

[56] References Cited

U.S. PATENT DOCUMENTS

| 3,823,486 | 7/1974 | Bhat et al. | 33/366 |
| 3,906,471 | 9/1975 | Shawhan | 33/366 X |
| 3,946,494 | 3/1976 | Wells | 33/366 |
| 4,028,815 | 6/1977 | Buckley et al. | 33/366 |
| 4,167,818 | 9/1979 | Cantarella et al. | 33/366 |

Primary Examiner—Charles E. Phillips
Attorney, Agent, or Firm—Oblon, Fisher, Spivak, McClelland & Maier

[57] ABSTRACT

A transducer is described which has primary application in a clinometer, detail of which is also contained in the application.

The transducer comprises a hollow cylindrical housing of glass or plastics material (10) having a single electrode (12) mounted on one end face and three equal equally spaced electrodes (14,16 and 18) on the opposite end face.

The three separate capacitors having a common plate (12) control the frequency of oscillation of three oscillator circuits (30,32 and 34) the outputs of which are compared by comparators (38,46 and 48) and decoded by decoding circuit (40). A computing device (42) provides an output signal for an indicator (44).

An audible indication of inclination for use in combination with the device is described.

11 Claims, 4 Drawing Figures

CLINOMETER

DESCRIPTION

1. Field of Invention

This invention concerns instruments for measuring inclination from a datum commonly referred to as clinometers. Whilst clinometers having a restricted range of inclination measurement are well known in the form of a common spirit level the present invention is concerned with a device which is capable of measuring inclination over a larger range of angles.

2. Background of the Invention

The conventional spirit level serves mainly as as an indication of true level. Thus a spirit level can be adapted to indicate whether a surface is horizontal or vertical or occupies some given inclination such as 45° to the vertical or horizontal. If a quantative measure of inclination is required then additional apparatus is required.

Whilst various devices have been proposed for measuring inclination using as part of the apparatus a datum defining device such as a spirit level or pendulum or mechanical equivalent thereof, such devices do not normally respond very quickly to change and have to be accurately set up and carefully calibrated before a reading can be taken.

It is an object of the present invention to provide a simple and robust device which can be used as a transducer in a level sensing instrument and which will provide a wide range of outputs depending on inclination which can be decoded electrically to provide an electrical signal indicative of inclination.

THE INVENTION

According to one aspect of the present invention a transducer having electrical characteristics which alter depending on the rotation of the transducer about an axis comprises a housing for defining a fluid chamber, the chamber having two opposed faces on which conductor means are located, therebeing at least two and preferably three separate similarly shaped conductor means on one of the said opposed faces and at least one conductor means on the other opposed face, the interior of the chamber being partly filled with a liquid having a di-electric constant different from the remainder of the contents of the chamber (typically air).

Typically the chamber is in the form of a cylindrical drum and the two plane cylindrical faces of the drum comprise the said two opposed faces of the said chamber.

Typically three equal and equally spaced apart segments of conductive material are arranged around one of the circular faces and a circle or annulus of conducting material is located on the other circular face of the drum.

It is found in practice that by rotating the drum around its central axis so the capacitance between the common conductor means on the one face and the three separate conductive segments on the other face of the drum varies and the variation of capacitance can be monitored by an electrical circuit adapted to produce from the varying capacitance effect an electrical signal indicative of the angle through which the device has been rotated or the angle by which the rotated position of the transducer departs from a given datum such as the vertical, the datum being defined by a particular pattern of capacitance values.

The areas of conductive material may be sheet metal stampings stuck or otherwise secured around the circular end faces of the drum. Alternatively they may be vacuum deposited or screen printed thereon. In a further alternative a thin metal foil applied to the circular end face may be etched away so as to leave either a circular plate or an annulus or three segments of an annulus on the face.

Preferably the conductive material is applied to the outer faces of the drum although it is not essential.

Preferably the width of the drum between the two faces is as small as is compatible with strength considerations requisite on the final instrument. Where the latter is to be used in a laboratory obviously the device can be far less robust than in the case of an instrument designed to be used on a building site or in the course of engineering construction or mining or the like.

Typically the drum is half filled with a liquid, the remainder of the drum being filled with air or a gas. Typically the di-electric constant of the liquid is considerably higher than the di-electric constant of the air or gas occupying the remainder of the chamber.

It is of course essential that at least the two opposed faces of the chamber and preferably the whole of the chamber be formed from a material having a very high di-electric constant so that the material from which the chamber is constructed does not detract from the capacitance between the opposed faces of the chamber.

The chamber may thus be formed from glass or a plastics material.

According to another aspect of the invention an instrument for measuring inclination comprises a housing containing a transducer constructed in accordance with the first aspect of the invention, the transducer being mounted within the housing relative to a surface of the housing which is to serve as a measuring surface such that the axis of rotation of the transducer is parallel to the said measuring surface and such that tilting the housing so that the measuring surface occupies different angles of inclination relative to the vertical will produce an effective rotation of the transducer about its axis of rotation, electric circuit means responsive to changes in the relative capacitance of the transducer for producing alternating electric currents the frequency of which varies with changes in capacitance of the transducer, comparator means for determining the relative frequencies of the signals from the various electrical circuit means and producing difference signals therefrom, decoding circuit means for decoding the difference signals and producing digital signals for processing by a computing circuit programmed to compute from the difference signals an electrical signal having a parameter whose value varies with the angular rotation of the transducer about its axis of rotation and output means responsive to the varying parameter electrical signal from the computing circuit means for indicating the angle of rotation of the transducer about its axis of rotation.

The output means may for example comprise a meter in which the deflection of the pointer increases with increasing rotation of the transducer about its axis of rotation from a datum.

The output means may be located within the housing containing the transducer, or the transducer with or without some of the associated electric circuitry, may be located within the housing and the output means and the remainder of the electric circuitry may be located within a second housing connected to the first housing by means of a flying lead.

According to a preferred feature of the present invention circuit means is provided responsive to an electrical signal from the transducer to produce an output signal for driving a sound producing device such as a loudspeaker, the output signal varying in content and/or frequency and/or amplitude in sympathy with variation of the level or inclination under measurement.

For example, the circuit means may produce a rising frequency signal as the inclination or level departs from a data (ie to one side or the other or above or below), the circuit means being arranged to produce a zero frequency signal when the actual level or inclination is achieved.

Alternatively, the output signal indicating the inclination may be encoded so as to provide an address stored within an address register to locate one of a number of locations within a memory at each of which is stored an electrical signal which can be decoded and after amplification supplied to a loudspeaker or similar device to provide a verbal description of the angle of tilt as detected by the transducer supplying the initial information. The number of individual statements of angle of inclination is dependent merely on the capacity of the memory and if the capacity of the memory is sufficient, statements of inclination can be provided for every one degree interval between the horizontal and, for example, the vertical.

Alternatively, the output signal may be coded, for example, within one or more tones which may be combined with a sequence of periods of sound and of silence to indicate inclination. Coding may be as employed in the systems in use for radio navigation aids.

In order to converse battery power, audible indication may be rendered inoperable except when the inclination being measured is close to a datum such as the vertical or horizontal or to a programmed datum such as a desired angle of inclination which is sought.

The invention will now be described by way of example with reference to the accompanying drawings.

IN THE DRAWINGS

DETAILED DESCRIPTION OF DRAWINGS

Figure 1:
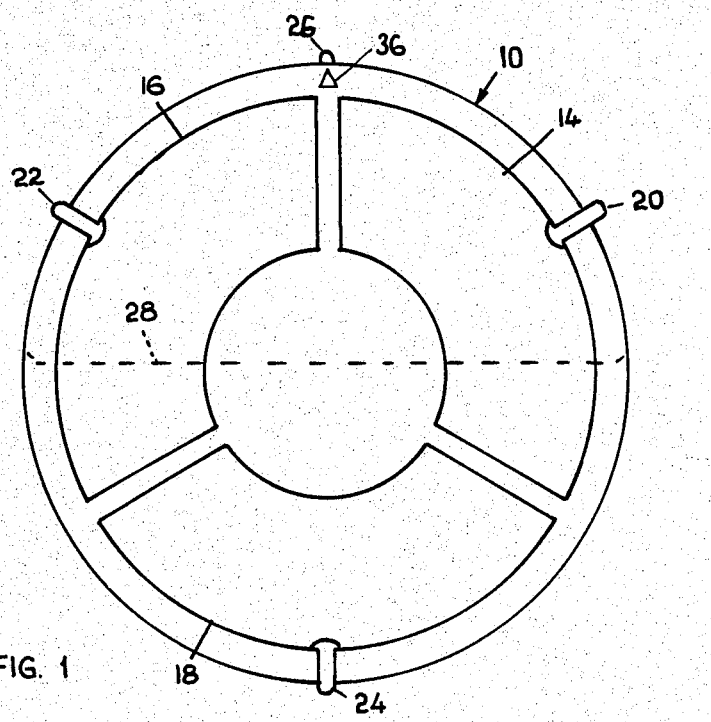
FIG. 1 is a side elevation of a transucer constructed in accordance with one aspect of the present invention.
Figure 2:
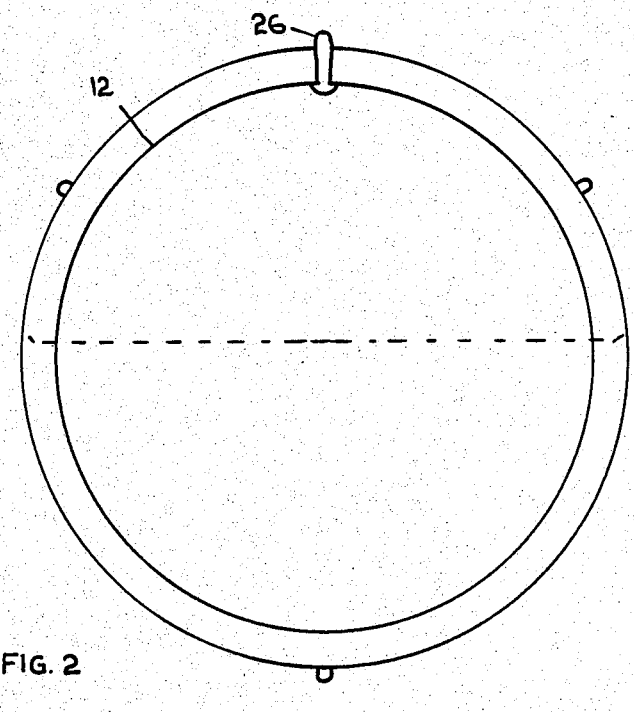
FIG. 2 is a view of the opposite side of the transducer shown in FIG. 1.
Figure 3:
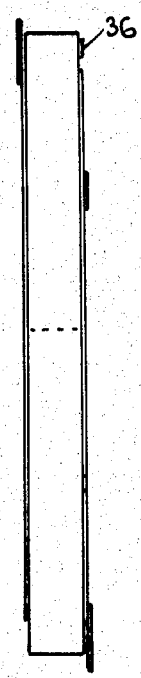
FIG. 3 is an end view of the transducer shown in FIGS. 1 and 2.

FIGS. 1, 2, and 3 illustrate a transducer embodying the invention. The transducer comprises a shallow cylindrical drum 10 having a cylindrical plate electrode 12 on the rear side and three equal annular segment electrodes 14, 18 and 18 on the opposite end face.

The housing is formed from glass or plastics material whilst the electrodes 12 to 18 are formed from metal or a metalised deposit or other conductive material such as foil.

Electrical connection is made to the electrodes by means of terminals 20, 22 and 24 and in the case of the larger electrode 12 by means of terminal 26.

Within the cylindrical housing is a quantity of dielectric liquid the level of which is shown in dotted outline at 28.

The remainder of the interior of the housing 10 is filled with air or a gas.

It will be seen that in the position shown, the capacitance between electrodes 16 and 12 and 14 and 12 will be substantially identical since the area of the electrodes 14 and 16 affected by the di-electric liquid is substantially the same. The di-electric liquid is arranged to have a di-electric constant considerably higher than that of the gas or the air so that the capacitants between electrodes 14 and 12 and 16 and 12 respectively is to a large extent determined by the area of electrodes 14 and 16 which are affected by the di-electric liquid.

If the housing 10 is rotated about its central axis by a few degrees, the level of the liquid 28 will remain horizontal and the area of the electrode 14 effected by the di-electric liquid will be increased while that of the electrode 16 will be decreased. The effect is to vary the capacitan between the electrodes 14 and 12 and 16 and 12 respectively, the capacitance of the first mentioned electrodes increasing and that between the second mentioned electrodes decreasing.

If the housing is tilted in the opposite direction the reverse will occur.

Whilst the rotation does not take the third electrode 18 out of the lower half of the circular outline of the housing, the capacitance between the electrode 18 and the electrode 12 will remain substantially constant. However, after the housing 10 has been rotated through 60° from the initial position (which can be considered to correspond to vertical) the electode 18 will no longer be wholly affected by the di-electric liquid 28 and the capacitance between the electrode 18 and the electrode 12 will begin to decrease with continued rotation of the housing 10. On the other hand this will correspond with a complete submergence of one of the other electrodes (with clockwise rotation electrode 14) the capacitance of which will thus remain substantially constant with further rotation until it in turn begins to leave the influence of the di-electric liquid. The same would apply to the capacitance between the electrodes 16 and 12.

This variation of capacitance is used to indicate the inclination or otherwise of the housing 10. To this end the three electrodes 14, 16 and 18 are connected into three oscillator circuits 30, 32, and 34, whilst conveniently the common electrode 12 is grounded. The three oscillators 30 to 34 supply three alternating current electric signals to three terminals A, B and C, the frequency of the alternating current signal at each of the points A, B and C being determined by the capacitance for the time being of the electrode pair 12, 14 or 12, 16 or 12 18 associated with the oscillator circuit supplying that terminal.

Conveniently the housing is provided with a mark 36 positioned around the circumference of the cylinder such that when pointing upwards, with the axis of the cylindrical drum 10 horizontal, the capacitance between plates 14 and 12 and 16 and 12 is the same. In this condition the frequency of the signal at A and B will be the same whilst that at C will be different and typically will be much lower due to the higher capacitance between electrodes 18 and 12.

If the housing 10 is now rotated through a few degrees in the clockwise direction, the capacitance between electrodes 14 and 12 will increase and between electrodes 16 and 12 will decrease in the frequency of the signal at A and an increase in the frequency of the signal at B.

By comparing the two signals A and B in a comparator 38 a signal is obtained indicative of the difference which after decoding in a decode circuit 40 can produce a digital signal for computation in a computing circuit 42 programmed to deliver an output signal having a parameter indicative of the magnitude of the deflection from the datum (when point 36 is pointing upwards) for display for example on a meter 44.

In order to give complete information to the computing circuit 42, further comparators 46 and 48 are required for comparing the frequencies of the signals at A and C and B and C respectively and the outputs from these comparators are also supplied to the decoding circuit 40 to provide further signals to the inputs of the computing circuit 42.

Figure 4:
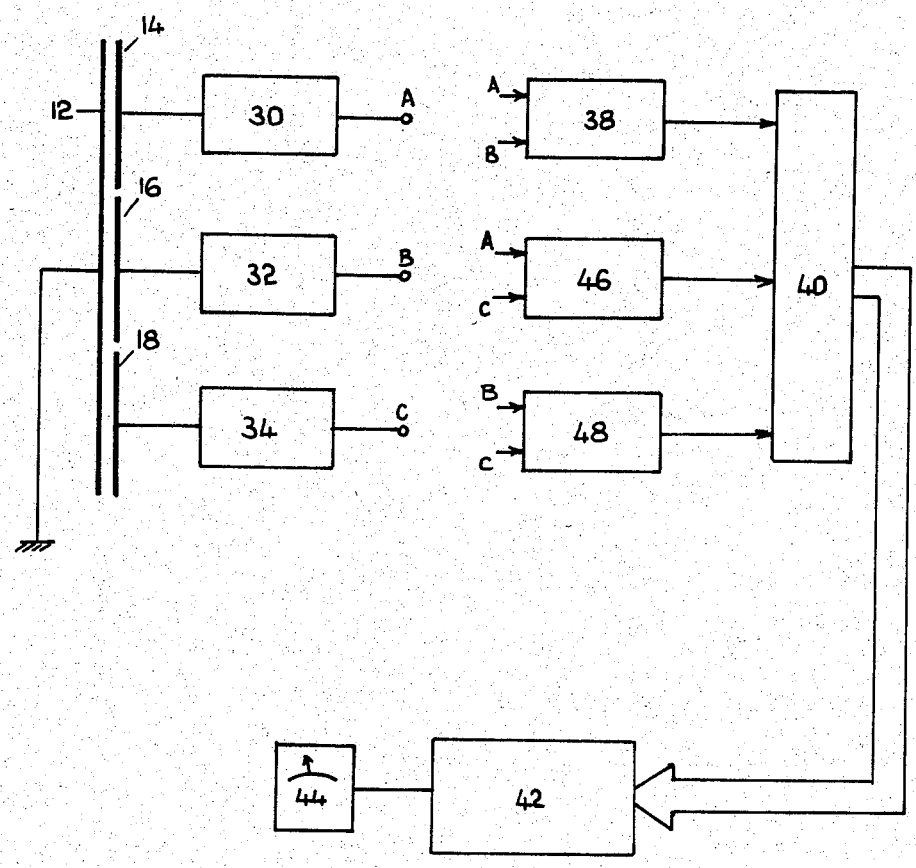
FIG. 4 is a schematic circuit diagram showing how the transducer can be utilised in practice to indicate inclination.

With the information available in the circuit of FIG. 4 the computing circuit 42 can be programmed so as to determine the angle of inclination of the housing 10 from the vertical (defined by the mark 36 pointing upwards) and can adduce from the information available from the comparators 38, 46 and 48 sufficient information to enable the output from the computing circuit 42 to indicate all 360° of rotation of the housing 10 if so required.

For most applications inclination through 90° or at the most 180° would be sufficient and calibration of the display 44 and appropriate limitation of the computing ability within the computing circuit 42 would be arranged.

It is to be noted that the device is susceptible to tilt unless this occurs in such a way that the axis of the cylindrical housing 10 always remains within a single vertical plane. It will be seen that provided the latter condition is fulfilled, the absolute capacitance between the electrodes 16 and 12 and 14 and 12 will change with tilt but the difference incapacitance between the capacitance of electrodes 14 and 12 and 16 and 12 will remain constant to a first approximation so that the output of comparator 38 will indicate a constant difference for the decoder 40 and computing circuits 42.

Provided the electrode 18 remains submerged relative to the meniscus of the dielectric liquid 28 the capacitance of the electrodes 18 and 12 will remain substantially constant during all angles of tilt.

The expression tilt has been used to describe an inclination of the housing 10 about an axis perpendicular to the axis of rotation and in a plane containing the axis of rotation. This is not to be confused with the expression inclination which is actually measured by the device and is a measure of the rotation of the device about its central axis relative to some datum such as the vertical.

Although not shown the housing 10 may be fitted with a larger overall housing which may contain some or all of the electric circuits associated therewith but may alternatively be in the form of a portable housing containing perhaps only some of the electric circuits and connected by a flexible flying lead to the main control unit containing the remainder of the electric circuits and the display device 44 or the like. As an alternative to the original display devices described, the invention envisages the use of a digital display device using either light emitting diodes or a liquid crystal display, or an Inogen Moire system or an analog LCD display.

The transducer may be used in the manner so far described or may be mounted with the faces having the conductors, horizontal.

I claim:

1. A transducer having electrical capacitances which alter depending on the rotation of the transducer about an axis, comprising:
   a housing defining a fluid chamber, said chamber being in the form of a cylindrical drum and the two plane cylindrical faces of said drum comprise two opposed faces of said chamber and said chamber having conductor means located on said two opposed faces, there being at least two similarly shaped conductor means on one of said opposed faces and at least one conductor means on the other opposed face, and wherein the interior of said chamber is partially filled with a liquid having a di-electric constant different from the remainder of the contents of said chamber; wherein said chamber is mounted relative to a surface which is to serve as a measuring surface, such that the axis of rotation of said chamber is parallel to said measuring surface and such that the tilting of said chamber so that said measuring surface occupies different angles of inclination relative to the vertical, will produce an effective rotation of the transducer about its axis of rotation;
   electrical circuit means responsive to changes in the relative capacitance of said two opposed faces of said chamber for producing alternating electric currents, the frequency of which varies with changes in said relative capacitance;
   comparator means for determining the relative frequencies of the signals from said electric circuit means and for producing different signals therefrom;
   decoding circuit means for decoding said different signals and producing digital signals;
   computing circuit means for processing said digital signals in order to provide an electrical signal having a parameter whose value varies with the angular rotation of said chamber about its axis of rotation; and
   output means responsive to the said varying parameter of electric signal from said computing circuit means for indicating the angle of rotation of said chamber about its axis of rotation.

2. A transducer as set forth in claim 1 in which there are three similarly shaped conductor means on one of said opposed faces.

3. A transducer as set forth in claim 2 in which at least the opposed faces of the chamber are formed from glass material.

4. A transducer as set forth in claim 2 in which at least the opposed faces of the chamber are formed from plastics material.

5. A transducer as set forth in claim 1 in which three equal and equally spaced apart segments of conductive material are arranged around one of the circular faces of the drum and a circle or annulus of conducting material is located around the other circular face of the drum.

6. A transducer as set forth in claim 1 in combination with electrical signal indicative of the angle through which the drum has been rotated in response to the variation of capacitance produced with the rotation of the drum, the datum being defined by a particular pattern of capacitance values.

7. A transducer as set forth in claim 1 in combination with electrical signal indicative of the angle by which the rotated position of the transducer drum departs from a given datum in response to the variation of capacitance produced with the rotation of the drum, the datum being defined by a particular pattern of capacitance values.

8. A transducer and measuring instrument as set forth in claim 1 further comprising circuit means responsive to an electrical signal from the transducer to produce an output signal for driving a sound producing device such as a loudspeaker, the output signal varying in content in sympathy with variation of the level or inclination under measurement.

9. A transducer and measuring instrument as set forth in claim 1 further comprising circuit means responsive to an electrical signal from the transducer to produce an output signal for driving a sound producing device such as a loudspeaker, the output signal varying in frequency in sympathy with variation of the level or inclination under measurement.

10. A transducer and measuring instrument as set forth in claim 1 further comprising circuit means responsive to an electrical signal from the transducer to produce an output signal for driving a sound producing device such as a loadspeaker, the output signal varying in amplitude in sympathy with variation of the level or inclination under measurement.

11. A transducer and inclination measuring instrument as set forth in claim 1 in which the output means comprises a meter in which the deflection of a pointer increases with increasing rotation of the transducer about its axis of rotation from a datum.

* * * * *